United States Patent
Wu et al.

(10) Patent No.: US 10,923,045 B1
(45) Date of Patent: Feb. 16, 2021

(54) BACKLIGHT CONTROL DEVICE AND METHOD

(71) Applicant: HIMAX TECHNOLOGIES LIMITED, Tainan (TW)

(72) Inventors: Biing-Seng Wu, Tainan (TW);
Chiao-An Chuang, Tainan (TW);
Chih-Ming Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/695,205

(22) Filed: Nov. 26, 2019

(51) Int. Cl.
*G09G 3/34* (2006.01)
*G06T 7/73* (2017.01)
*G06K 9/00* (2006.01)

(52) U.S. Cl.
CPC ....... *G09G 3/3406* (2013.01); *G06K 9/00228* (2013.01); *G06T 7/73* (2017.01); *G06T 2207/10144* (2013.01); *G06T 2207/30201* (2013.01); *G09G 2320/0626* (2013.01); *G09G 2358/00* (2013.01)

(58) Field of Classification Search
CPC .... G06F 9/3838; G06F 9/44505; G06F 9/454; G06F 3/005
See application file for complete search history.

(56) References Cited

U.S. PATENT DOCUMENTS

| | | | |
|---|---|---|---|
| 5,781,650 A * | 7/1998 | Lobo | G06K 9/00221 382/118 |
| 7,522,773 B2 * | 4/2009 | Gallagher | G06K 9/00288 382/118 |
| 8,913,004 B1 | 12/2014 | Bozarth et al. | |
| 8,922,480 B1 | 12/2014 | Freed et al. | |
| 10,599,877 B2 * | 3/2020 | Lam | G06F 21/577 |
| 2002/0067856 A1 * | 6/2002 | Fujii | G06K 9/00288 382/218 |
| 2005/0185837 A1 * | 8/2005 | Takano | H04N 1/4072 382/162 |
| 2008/0007634 A1 * | 1/2008 | Nonaka | H04N 5/2355 348/234 |
| 2010/0007726 A1 * | 1/2010 | Barbieri | G06K 9/0061 348/78 |

(Continued)

FOREIGN PATENT DOCUMENTS

| CN | 102119530 | 7/2011 |
|---|---|---|
| CN | 101573747 | 4/2012 |

(Continued)

OTHER PUBLICATIONS

"Office Action of Taiwan Counterpart Application", dated Aug. 28, 2020, p. 1-p. 8.

*Primary Examiner* — Olga V Merkoulova
(74) *Attorney, Agent, or Firm* — JCIPRNET

(57) ABSTRACT

A backlight control device and method are provided. The backlight control device includes an event detection circuit and a backlight controller. The event detection circuit receives an image frame. The event detection circuit determines whether there is a user face in the image frame to generate a first determining result. The backlight controller is coupled to the event detection circuit to receive the determining result. When the first determining result indicates that there is no user face in the image frame, the backlight controller dims the backlight of a display panel.

14 Claims, 7 Drawing Sheets

(56) References Cited

U.S. PATENT DOCUMENTS

| | | | | |
|---|---|---|---|---|
| 2011/0067098 | A1* | 3/2011 | Nelson | G06F 21/32 726/21 |
| 2011/0179366 | A1* | 7/2011 | Chae | G06F 21/84 715/764 |
| 2011/0298817 | A1* | 12/2011 | Oshinome | G06F 21/84 345/589 |
| 2012/0002878 | A1* | 1/2012 | Kuriyama | G06K 9/00221 382/195 |
| 2012/0038546 | A1* | 2/2012 | Cromer | G06F 1/1626 345/156 |
| 2012/0287031 | A1* | 11/2012 | Valko | G06K 9/00255 345/156 |
| 2013/0057573 | A1* | 3/2013 | Chakravarthula | G06F 3/005 345/619 |
| 2013/0247174 | A1* | 9/2013 | Wada | G06F 21/31 726/19 |
| 2013/0254874 | A1* | 9/2013 | Xu | G06F 21/6209 726/17 |
| 2014/0132508 | A1* | 5/2014 | Hodge | G06F 3/013 345/156 |
| 2014/0201805 | A1* | 7/2014 | Riordan | G06F 21/60 726/1 |
| 2015/0003691 | A1* | 1/2015 | Joo | G06K 9/00604 382/117 |
| 2015/0163246 | A1* | 6/2015 | Laadan | H04W 12/08 726/1 |
| 2015/0242993 | A1* | 8/2015 | Raman | G06T 3/40 345/589 |
| 2016/0188904 | A1* | 6/2016 | Singh | G06F 21/6245 726/27 |
| 2016/0188973 | A1* | 6/2016 | Ziaja | G06F 21/62 382/116 |
| 2016/0371504 | A1* | 12/2016 | Huang | G06F 21/74 |
| 2017/0040002 | A1* | 2/2017 | Basson | G06F 21/84 |
| 2017/0337352 | A1* | 11/2017 | Williams | G06T 19/006 |

FOREIGN PATENT DOCUMENTS

| | | |
|---|---|---|
| CN | 102592564 | 4/2016 |
| CN | 109725448 | 5/2019 |
| TW | 200743067 | 11/2007 |

* cited by examiner

BACKLIGHT CONTROL DEVICE AND METHOD

BACKGROUND OF THE INVENTION

1. Field of the Invention

The invention generally relates to a display device with an image/depth sensing circuit, in particular, to a backlight control device and a backlight control method.

2. Description of Related Art

When a display device is used in an environment with insufficient brightness, the brightness of a display panel is greatly different from the ambient brightness, which makes a user feel uncomfortable. Therefore, as the environment becomes darker, the brightness of the display panel shall also be dimmed accordingly. The dimmed display device may save energy and power in addition to avoiding the discomfort of the user. A conventional display device needs to be additionally provided with a light sensor to sense the ambient brightness.

In addition, in the process of using the display device by a legal user, there might be other people peeping at a display content of the display device. Alternatively, the legal user is often away from the display device temporarily to handle other things during the use of the display device. When the legal user is away from the display device, other people are likely to peep at the display content of the display device. Therefore, the legal user needs to manually turn off the display device before leaving.

It should be noted that the information disclosed in this Background section is only for enhancement of understanding of the background of the invention and therefore it may contain some information (or all information) that does not form the prior art that is already known to a person of ordinary skill in the art. Further, the information disclosed in the Background section does not mean that one or more problems was acknowledged by a person of ordinary skill in the art.

SUMMARY OF THE INVENTION

The invention provides a backlight control device and method, so as to automatically dim (or turn off) backlight of a display panel according to an image frame.

The backlight control device of the invention includes an event detection circuit and a backlight controller. The event detection circuit is configured to receive an image frame. The event detection circuit determines whether there is a user face in the image frame to generate a determining result. The backlight controller is coupled to the event detection circuit to receive the determining result. When the determining result indicates that there the user face is determined, the backlight controller adjusts backlight of a display panel to normal brightness. Wherein, the size of the user face is greater than a first threshold and in a predetermined region.

The backlight control method of the invention includes: receiving, by an event detection circuit, an image frame; determining, by the event detection circuit, whether there is a user face in the image frame to generate a determining result; and adjusting, by a backlight controller, backlight of a display panel to normal brightness when the determining result indicates that the user face is determined, wherein the size of the user face is greater than a first threshold and in a predetermined region.

The backlight control device of the invention includes an event detection circuit and a backlight controller. The event detection circuit is configured to receive an automatic exposure gain or exposure duration corresponding to an image frame. The event detection circuit determines a change scope of the automatic exposure gain or the exposure duration to generate a determining result. The backlight controller is coupled to the event detection circuit to receive the determining result. The backlight controller correspondingly adjusts backlight of a display panel according to the determining result.

Based on the above, the backlight control devices of the embodiments of the invention may receive the image frame from a sensing circuit. The event detection circuit may determine whether there is a user face in the image frame, and the backlight controller may automatically dim (or turn off) the backlight of the display panel according to the determining result.

To make the features and advantages of the invention clear and easy to understand, the following gives a detailed description of embodiments with reference to accompanying drawings.

DESCRIPTION OF THE EMBODIMENTS

Figure 1:
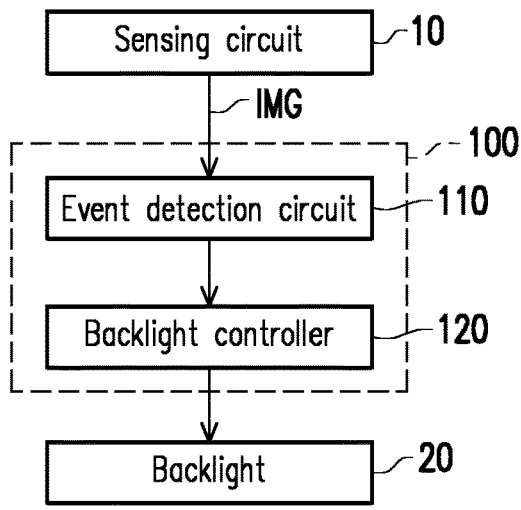
FIG. 1 is a schematic circuit block diagram of a backlight control device according to an embodiment of the invention.

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

FIG. 1 is a schematic circuit block diagram of a backlight control device 100 according to an embodiment of the invention. A sensing circuit 10 works in always-on operation and may provide an image frame IMG to the backlight control device 100. The present embodiment does not limit the implementation details of the sensing circuit 10. According to the design requirements, in some embodiments, the sensing circuit 10 includes an image sensor, such as a low-power always-on image sensor, to provide the image frame IMG, such as a color image or a monochrome image. In other embodiments, the sensing circuit 10 further includes a depth map generator to provide a depth map as the image frame IMG. When a user appears in front of a display panel (not shown) of a display device, such as a laptop, smart phone, a tablet or a monitor, the sensing circuit 10 may shoot the user to generate the image frame IMG. Therefore, the backlight control device 100 may determine whether there is a user in front of the display panel (not shown) according to the image frame IMG.

The backlight control device 100 shown in FIG. 1 includes an event detection circuit 110 and a backlight controller 120. The event detection circuit 110 is coupled to the sensing circuit 10 to receive the image frame IMG. The event detection circuit 110 may determine whether there is a user face in the image frame IMG to generate a determining result. The present embodiment does not limit the implementation details of "determining whether there is a user face in the image frame IMG". According to the design requirements, in some embodiments, the event detection circuit 110 may perform a conventional algorithm or other image recognition algorithm to perform face recognition on the image frame IMG. The backlight controller 120 is coupled to the event detection circuit 110 to receive the determining result. The backlight controller 120 adjusts the backlight of a display panel (not shown) to normal brightness when the determining result indicates that the user face is determined. Wherein, the size of the user face is greater than a first threshold and in a predetermined region. When the determining result of the event detection circuit 110 indicates that there is no user face in the image frame IMG, the backlight controller 120 dims backlight 20 of the display panel (not shown). In other embodiments, there is a message for warning the user through the screen of the display panel or a speaker embedded in the display device instead of dimming backlight.

Figure 2:
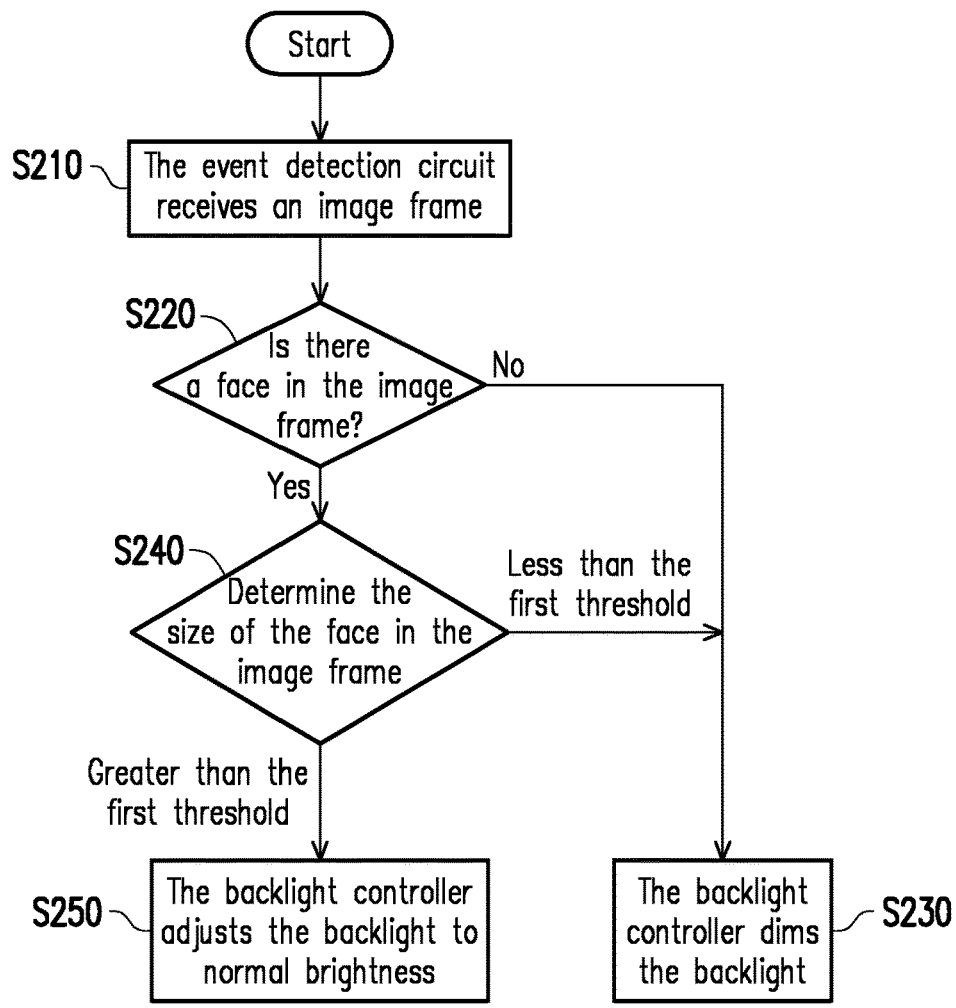
FIG. 2 is a schematic flow diagram of a backlight control method according to an embodiment of the invention.

FIG. 2 is a schematic flow diagram of a backlight control method according to an embodiment of the invention. Referring to FIG. 1 and FIG. 2, in Step S210, an event detection circuit 110 may receive an image frame IMG from a sensing circuit 10. In Step S220, the event detection circuit 110 may determine whether there is a user face in the image frame IMG to generate a determining result to a backlight controller 120. When the determining result of the event detection circuit 110 indicates that there is no user face in the image frame IMG (the determining result of Step S220 is "No"), the backlight control device 100 may proceed to Step S230. In Step S230, the backlight controller 120 may automatically dim the backlight 20 of a display panel (not shown) according to the determining result of the event detection circuit 110. For example, the backlight controller 120 may turn off a power source of the backlight 20.

A user may be possibly away from a display device (the backlight control device 100) temporarily to handle other things during the use of the display device. When the user is away from the display device, there is no user face in the image frame IMG, so that the backlight controller 120 may automatically dim the backlight 20. When the backlight 20 is dimmed (or turned off), the power consumption of the display device may be reduced. In addition, when the backlight 20 is automatically dimmed, other people are unable to peep at the display content of the display device.

When there is a user face in the image frame IMG (the determining result of Step S220 is "Yes"), the backlight control device 100 may proceed to Step S240. In Step S240, the event detection circuit 110 may further determine a size of the user face in the image frame IMG to generate a determining result to the backlight controller 120. When the determining result of the event detection circuit 110 indicates that there is a user face in the image frame IMG and the size of the user face in the image frame IMG is less than a first threshold (the determining result of Step S240 is "less than the first threshold"), the backlight control device 100 may proceed to Step S230. The "first threshold" may be determined according to the design requirements. The result "the size of the user face in the image frame IMG is less than the first threshold" indicates that the user is very far from the display device (the backlight control device 100), that is, the user is not in front of the display device. Since the user is not in front of the display device, the backlight controller 120 may automatically dim (or turn off) the backlight 20 to reduce the power consumption and prevent other people from peeping at the device.

When the determining result of the event detection circuit 110 indicates that there is a user face in the image frame IMG and the size of the user face in the image frame IMG is greater than the first threshold (the determining result of Step S240 is "greater than the first threshold"), the backlight control device 100 may proceed to Step S250. In Step S250, the backlight controller 120 may automatically adjust the backlight 20 to normal brightness. The "normal brightness" may be determined according to an application requirement. The result "the size of the user face in the image frame IMG is greater than the first threshold" indicates that the user has been already in front of the display device (the backlight control device 100). At this time, the backlight controller 120 may automatically brighten the backlight 20 to allow the user to watch the display content of the display panel (not shown).

Figure 3:
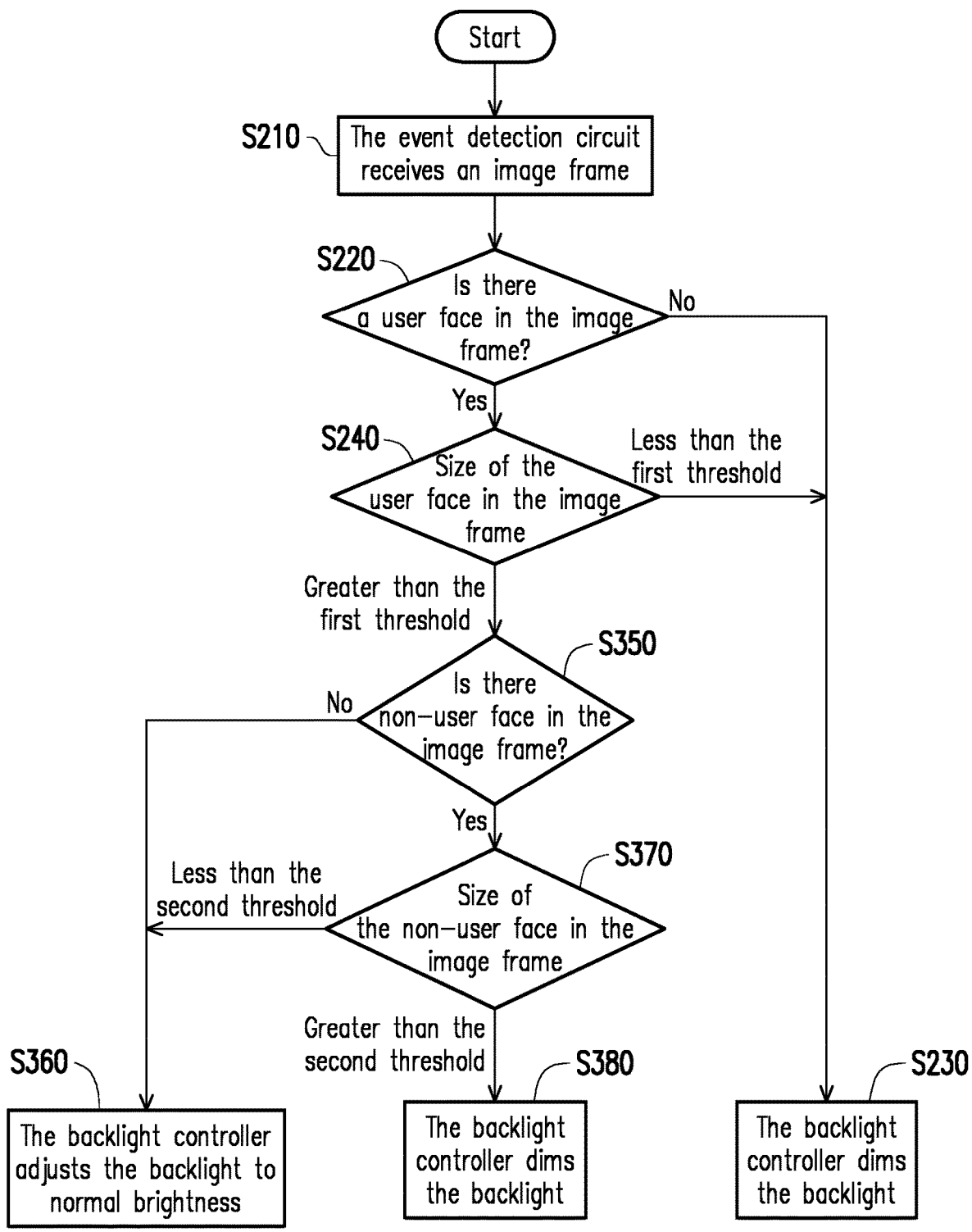
FIG. 3 is a schematic flow diagram of a backlight control method according to another embodiment of the invention.

FIG. 3 is a schematic flow diagram of a backlight control method according to another embodiment of the invention. Referring to FIG. 1 and FIG. 3, Step S210 to Step 240 shown in FIG. 3 may refer to the related descriptions of Step S210 to Step S240 shown in FIG. 2, so descriptions thereof are omitted. In an embodiment shown in FIG. 3, when the determining result of the event detection circuit 110 indicates that there is a user face in the image frame IMG and the size of the user face in the image frame IMG is greater than the first threshold (the determining result of Step S240 is "greater than the first threshold"), the backlight control device 100 may proceed to Step S350.

In Step S350, the event detection circuit 110 may further determine whether there is a non-user face (i.e., another face) in the image frame IMG to generate a determining result to the backlight controller 120. The "non-user face" means another face (an unauthorized face of a second person) in addition to the user face (the authorized face of a first person) determined in Step S240. When the determining result of the event detection circuit 110 indicates that there is no non-user face in the image frame IMG (the determining result of Step S350 is "No"), the backlight control device 100 may proceed to Step S360. In Step S360, the backlight controller 120 may adjust the backlight 20 to normal brightness. Step S360 shown in FIG. 3 may refer to the related description of Step S250 shown in FIG. 2, so descriptions thereof are omitted. The result "there is no non-user face in the image frame IMG" indicates that there is no one behind the user, if only one user face is authorized. At this time, the backlight controller 120 may automatically brighten the backlight 20 to allow the user to watch the display content of the display panel (not shown).

When the determining result of the event detection circuit 110 indicates that there is a non-user face in the image frame IMG (the determining result of Step S350 is "Yes"), the backlight control device 100 may proceed to Step S370. In Step S370, the event detection circuit 110 may further determine a size of the non-user face in the image frame IMG to generate a determining result to the backlight controller 120. When the determining result of the event detection circuit 110 indicates that the size of the non-user face in the image frame IMG is less than a second threshold (the determining result of Step S370 is "less than the second threshold"), the backlight control device 100 may proceed to Step S360. The "second threshold" may be determined according to the design requirements. The result "the size of the non-user face in the image frame is less than the second threshold" indicates that the another person is very far from the display device (the backlight control device 100). Since the user is in front of the display device, and the another person is not in front of the display device, the backlight controller 120 may automatically adjust the backlight 20 to normal brightness.

When the determining result of the event detection circuit 110 indicates that the size of the non-user face in the image frame IMG is greater than the second threshold (the determining result of Step S370 is "greater than the second threshold"), the backlight control device 100 may proceed to Step S380. In Step S380, the backlight controller 120 may automatically dim the backlight 20 according to the determining result of the event detection circuit 110. For example, the backlight controller 120 may turn off the power source of the backlight 20 in Step S380. In some other embodiments, the backlight controller 120 may reduce the brightness of the backlight 20 by half (or by other ratios) in Step S380 to warn the legal user of someone getting close. In some more embodiments, the backlight controller 120 may also inform a system to send a warning message to the legal user in addition to automatically dimming the backlight 20. It is noted that the size of the non-user face should be less than the size of the user face.

Figure 4:
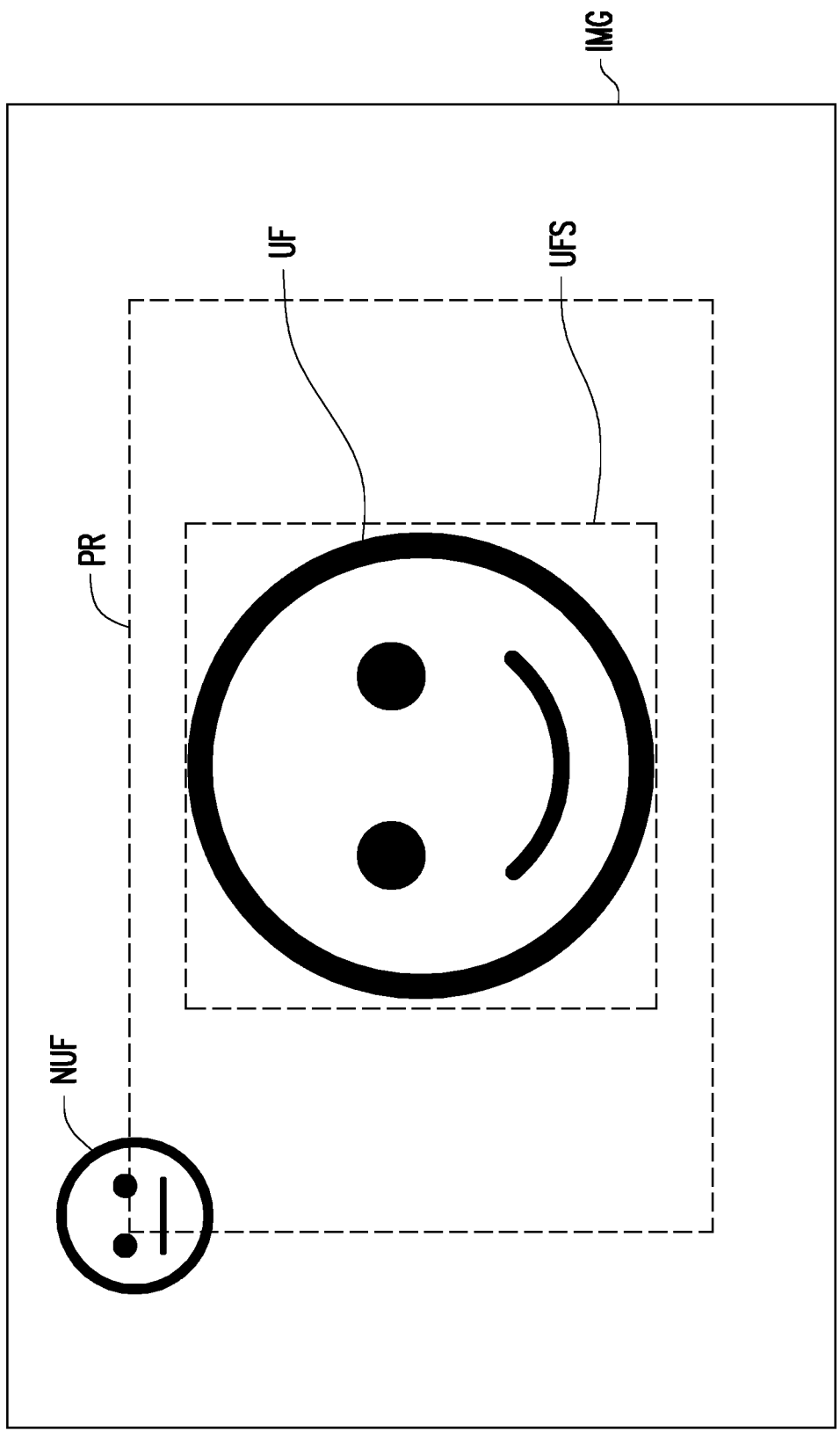
FIG. 4 is the image frame according to an embodiment of the invention.

FIG. 4 is the image frame IMG according to an embodiment of the invention. In the example of FIG. 4, the image frame IMG includes a user face UF and a non-user face NUF (another user face). The size UFS of the user face UF is greater than a first threshold, and the user face UF is in a predetermined region PR. Referring to FIG. 1 to FIG. 4, the event detection circuit 110 further determines whether there is a non-user face NUF. The backlight controller dims the backlight of the display panel when the determining result indicates that the non-user face is determined. Wherein, the size of the non-user face NUF is smaller than the size UFS of the user face UF, and the size of the non-user face NUF is greater than a second threshold. The first threshold is greater than the second threshold.

Figure 5:
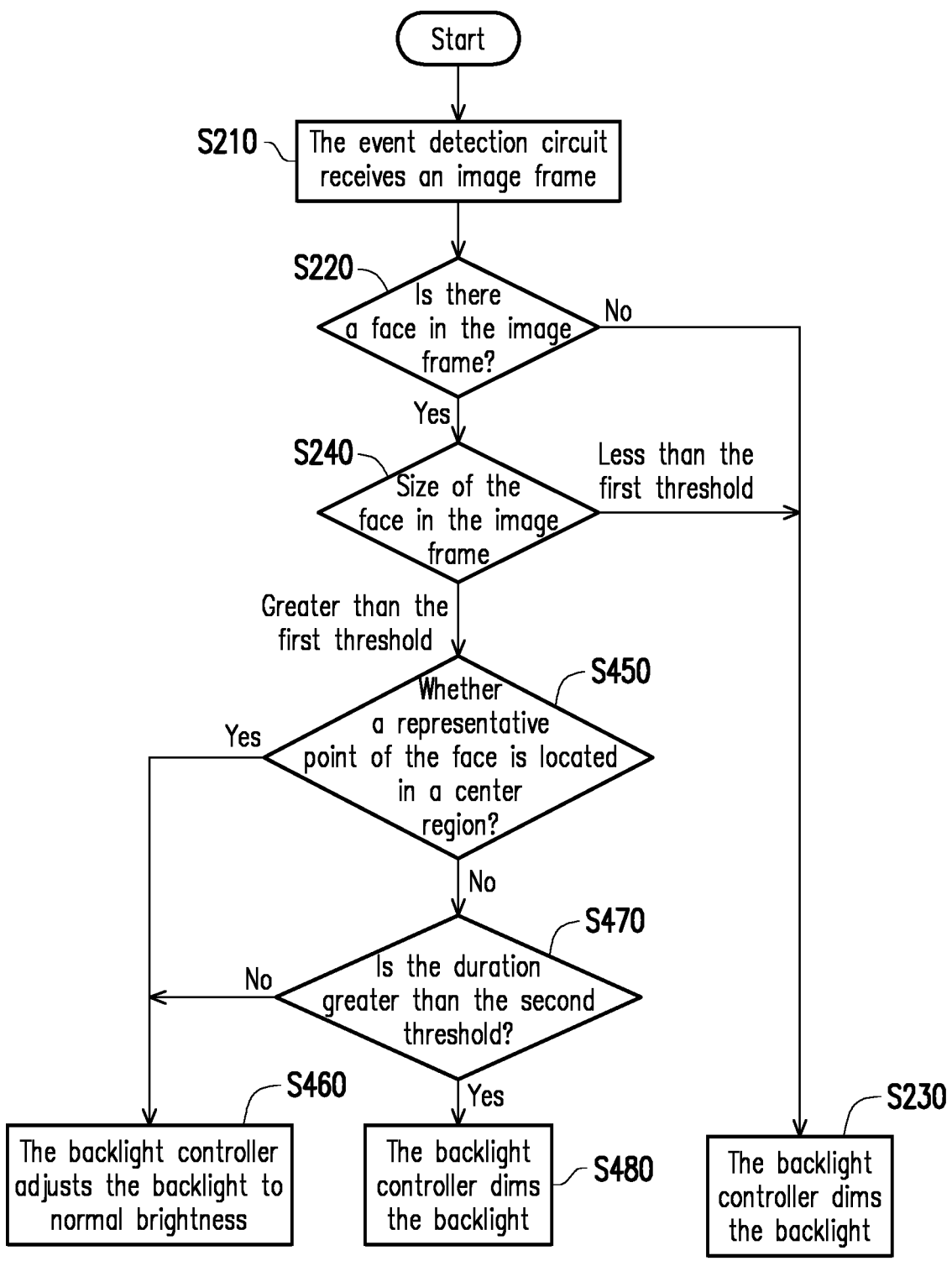
FIG. 5 is a schematic flow diagram of a backlight control method according to a further embodiment of the invention.

FIG. 5 is a schematic flow diagram of a backlight control method according to a further embodiment of the invention. Referring to FIG. 1 and FIG. 5, Step S210 to Step 240 shown in FIG. 5 may refer to the related descriptions of Step S210 to Step S240 shown in FIG. 2, so descriptions thereof are omitted. In an embodiment shown in FIG. 5, when the determining result of the event detection circuit 110 indicates that there is a user face in the image frame IMG and the size of the user face in the image frame IMG is greater than a first threshold (the determining result of Step S240 is "greater than the first threshold"), the backlight control device 100 may proceed to Step S450.

In Step S450, the event detection circuit 110 further determines whether a representative point (such as a nose or other points) of the user face is located in a center region of the image frame IMG to generate a determining result to the backlight controller 120. The center region may be set according to the design requirements. When the determining result of the event detection circuit 110 indicates that the representative point of the user face is located in the center region (the determining result of Step S450 is "Yes"), the backlight control device 100 may proceed to Step S460. In Step S460, the backlight controller 120 may adjust the backlight 20 to normal brightness. Step S460 shown in FIG. 5 may refer to the related description of Step S250 shown in FIG. 2, so descriptions thereof are omitted. The result "the representative point of the user face is located in the center region of the image frame IMG" indicates that the user wants to watch (is watching) the display content of the display panel (not shown). At this time, the backlight controller 120 may automatically brighten the backlight 20 to allow the user to watch the display content of the display panel (not shown).

When the determining result of the event detection circuit 110 indicates that the representative point of the user face is away from the center region of the image frame IMG (the determining result of Step S450 is "No"), the backlight control device 100 may proceed to Step S470. In Step S470, the event detection circuit 110 may further determine whether a representative point of the user face is located in the predetermined region and determine duration that the representative point of the user face is away from the predetermined region (e.g. center region or other region in the image frame) to generate a determining result to the backlight controller 120. When the determining result of the event detection circuit 110 indicates that the duration that the representative point of the user face is away from the predetermined region is less than a second threshold (the determining result of Step S470 is "No"), the backlight control device 100 may proceed to Step S460. In Step S460, the backlight controller 120 may adjust the backlight 20 to normal brightness. The second threshold may be set according to the design requirements.

When the determining result of the event detection circuit 110 indicates that the duration that the representative point of the user face is away from the predetermined region is greater than the second threshold (the determining result of Step S470 is "Yes"), the backlight control device 100 may proceed to Step S480. In Step S480, the backlight controller 120 may dim the backlight. For example, the backlight controller 120 may turn off the power source of the backlight 20 in Step S480. In some other embodiments, the backlight controller 120 may reduce the brightness of the backlight 20 by half (or by other ratios) in Step S480 to reduce the power consumption. In other embodiments, the event detection circuit 110 can also detect the user's gaze location or the eyes (blinking or closing the eyes). If the user does not look at the display panel for a while (or the user closes his eyes), the backlight controller 120 may dim the brightness.

Figure 6:
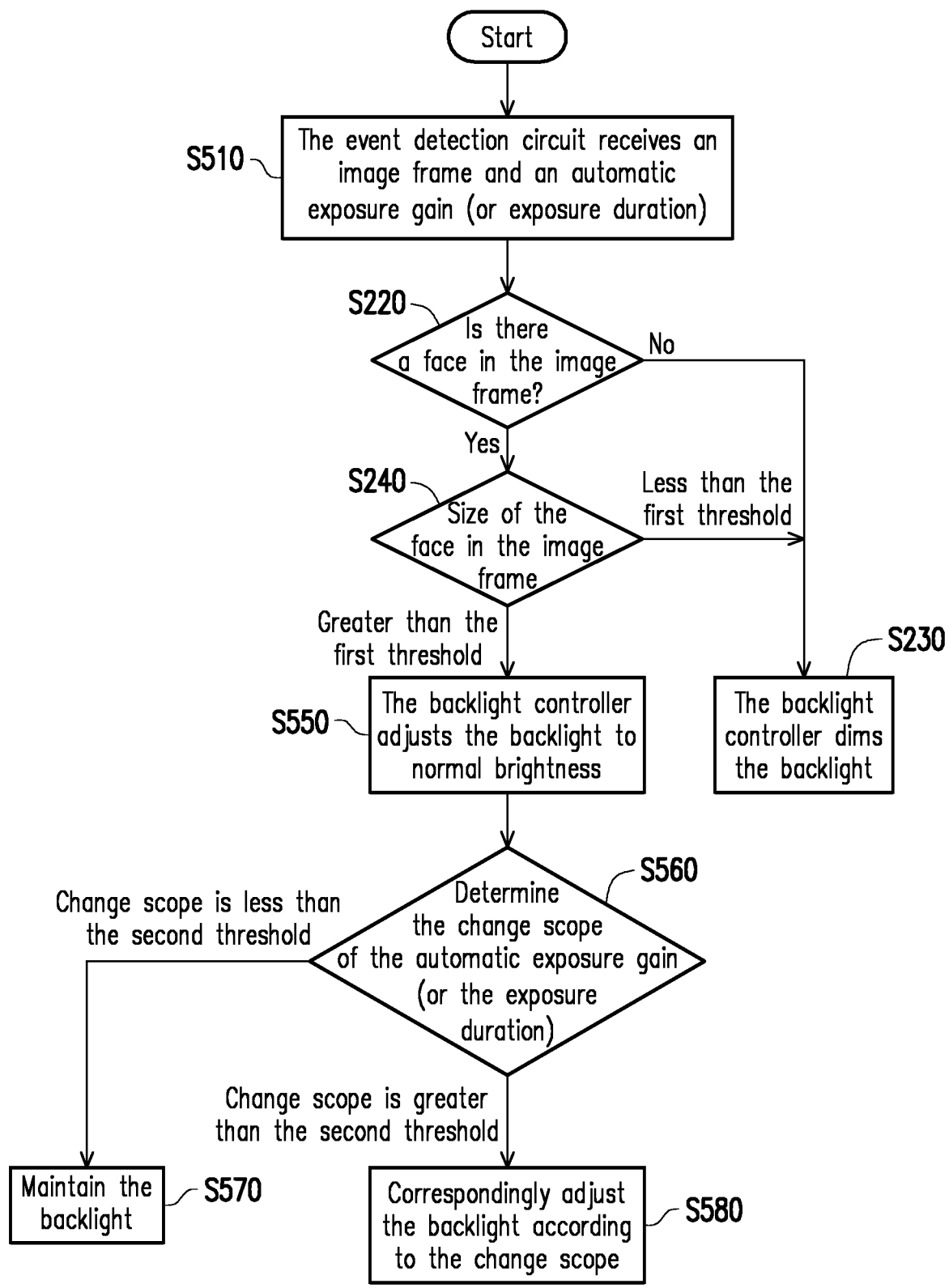
FIG. 6 is a schematic flow diagram of a backlight control method according to a further more embodiment of the invention.

FIG. 6 is a schematic flow diagram of a backlight control method according to a further more embodiment of the invention. Referring to FIG. 1 and FIG. 6, Steps S510, S220, S230 and S240 shown in FIG. 6 may refer to the related descriptions of Steps S210, S220, S230 and S240 shown in FIG. 2, so descriptions thereof are omitted. In Step S510 shown in FIG. 6, the event detection circuit 110 also receives an automatic exposure gain (or exposure duration) corresponding to the image frame IMG from a low-power always-on image sensor (a sensing circuit 10).

In an embodiment shown in FIG. 6, when the determining result of the event detection circuit 110 indicates that there is a user face in the image frame IMG and the size of the user face in the image frame IMG is greater than the first threshold (the determining result of Step S240 is "greater than the first threshold"), the backlight control device 100 may proceed to Step S550. In Step S550, the backlight controller 120 may adjust the backlight 20 to normal brightness. Step S550 shown in FIG. 6 may refer to the related description of Step S250 shown in FIG. 2, so descriptions thereof are omitted.

In Step S560, the event detection circuit 110 further determines a change scope of the automatic exposure gain (or the exposure duration) to generate a determining result to the backlight controller 120. The "change scope" may be a difference between an automatic exposure gain (or exposure duration) of a current frame and an automatic exposure gain (or exposure duration) of a previous frame. The backlight controller 120 may correspondingly adjust the backlight 20 according to the determining result of the event detection circuit 110.

When the determining result of the event detection circuit 110 indicates that the change scope is less than a second threshold (the determining result of Step S560 is "the change scope is less than the second threshold"), the backlight control device 100 may proceed to Step S570. In Step S570, the backlight controller 120 may maintain the backlight 20 (not change the brightness of the backlight 20).

When the determining result of the event detection circuit 110 indicates that the change scope is greater than the second threshold (the determining result of Step S560 is "the change scope is greater than the second threshold"), the backlight control device 100 may proceed to Step S580. In Step S580, the backlight controller 120 may correspondingly adjust the backlight 20 according to the change scope. For example, when the automatic exposure gain (or the exposure duration) is increased, it indicates that the ambient brightness is relatively dark, and at this time, the backlight controller 120 may correspondingly dim the backlight 20 according to the change scope. When the automatic exposure gain (or the exposure duration) is decreased, it indicates that the ambient brightness is relatively bright, and at this time, the backlight controller 120 may correspondingly brighten the backlight 20 according to the change scope.

Figure 7:
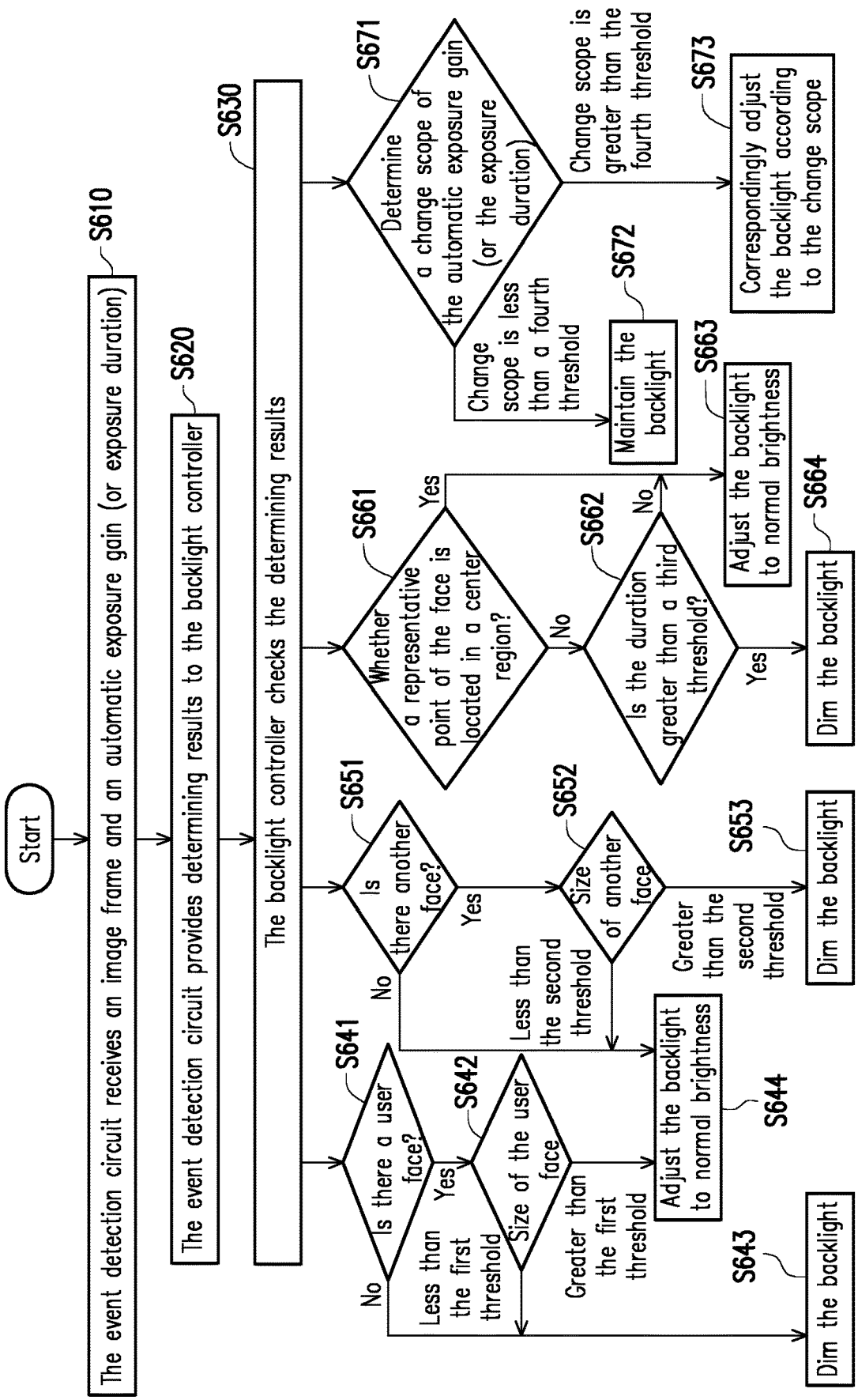
FIG. 7 is a schematic flow diagram of a backlight control method according to a still further more embodiment of the invention.

FIG. 7 is a schematic flow diagram of a backlight control method according to a still further more embodiment of the invention. Referring to FIG. 1 and FIG. 7, Step S610 shown in FIG. 7 may refer to the related description of Step S510 shown in FIG. 6, so descriptions thereof are omitted. In an embodiment shown in FIG. 7, the event detection circuit 110 may perform a variety of determinings on the image frame IMG and the automatic exposure gain (or the exposure duration) and provide determining results to the backlight controller 120 (Step S620). For example, the event detection circuit 110 may perform face recognition on the image frame IMG to determine whether there is a user face in the image frame IMG and determine a size of the user face in the image frame IMG. The event detection circuit 110 may further determine whether there is another user face in the image frame IMG and determine a size of the another user face in the image frame IMG. The event detection circuit 110 may further determine whether a representative point of the user face is located in a predetermined region of the image frame IMG and determine duration that the representative point of the user face is away from the predetermined region. The event detection circuit 110 may further determine a change scope of an automatic exposure gain (or exposure duration) corresponding to the image frame IMG.

The backlight controller 120 may check the determining results of the event detection circuit 110 to perform corresponding operations (Step S630). For example, the backlight controller 120 may know whether there is a user face in the image frame IMG (Step S641) and know whether the size of the user face exceeds a first threshold (Step S642) according to the determining results of the event detection circuit 110. Steps S641 and S642 shown in FIG. 7 may be analogized with reference to the related descriptions of Steps S220 and S240 shown in FIG. 2. When there is no user face in the image frame IMG (the determining result of Step S641 is "No"), or when the size of the user face in the image frame IMG is less than the first threshold (the determining result of Step S642 is "less than the first threshold"), the backlight control device 100 may proceed to Step S643 to automatically dim the backlight 20. Step S643 shown in FIG. 7 may refer to the related description of Step S230 shown in FIG. 2, so descriptions thereof are omitted. When there is a user face in the image frame IMG and the size of the user face in the image frame IMG is greater than the first threshold (the determining result of Step S642 is "greater than the first threshold"), the backlight control device 100 may proceed to Step S644. In Step S644, the backlight controller 120 may automatically adjust the backlight 20 to normal brightness. Step S644 shown in FIG. 7 may refer to the related description of Step S250 shown in FIG. 2, so descriptions thereof are omitted.

The backlight controller 120 may further know whether there is another user face in the image frame IMG (Step S651) and know whether the size of the another user face exceeds a second threshold (Step S652) according to the determining results of the event detection circuit 110. Steps S651 and S652 shown in FIG. 7 may be analogized with reference to the related descriptions of Steps S350 and S370 shown in FIG. 3. When there is no another user face in the image frame IMG (the determining result of Step S651 is "No"), or when the size of the another user face in the image frame IMG is less than the second threshold (the determining result of Step S652 is "less than the second threshold"), the backlight control device 100 may proceed to Step S644 to automatically adjust the backlight 20 to normal brightness. Step S644 shown in FIG. 7 may refer to the related description of Step S360 shown in FIG. 3, so descriptions thereof are omitted. When there is another user face in the image frame IMG and the size of the another user face in the image frame IMG is greater than the second threshold (the determining result of Step S652 is "greater than the second threshold"), the backlight control device 100 may proceed to Step S653. In Step S653, the backlight controller 120 may automatically dim the backlight 20. Step S653 shown in FIG. 7 may refer to the related description of Step S380 shown in FIG. 3, so descriptions thereof are omitted.

The backlight controller 120 may further know whether a representative point (such as a nose or other points) of the user face is located in a predetermined region (e.g. the center region of the image frame IMG) (Step S661), and know whether duration that the representative point of the user face is away from the predetermined region exceeds a third threshold (Step S662) according to the determining results of the event detection circuit 110. Steps S661 and S662 shown in FIG. 7 may be analogized with reference to the related descriptions of Steps S450 and S470 shown in FIG. 5. When the representative point of the user face is located in the predetermined region of the image frame IMG (the determining result of Step S661 is "Yes"), or when the duration that the representative point of the user face is away from the predetermined region is less than the third threshold (the determining result of Step S662 is "No"), the backlight control device 100 may proceed to Step S663 to automatically adjust the backlight 20 to normal brightness. Step S663 shown in FIG. 7 may refer to the related description of Step S460 shown in FIG. 5, so descriptions thereof are omitted. When the duration that the representative point of the user face is away from the predetermined region is greater than the third threshold (the determining result of Step S662 is "Yes"), the backlight control device 100 may proceed to Step S664. In Step S664, the backlight controller 120 may automatically dim the backlight 20. Step S664 shown in FIG. 7 may refer to the related description of Step S480 shown in FIG. 5, so descriptions thereof are omitted.

The backlight controller 120 may further know whether a change scope of the automatic exposure gain (or the exposure duration) exceeds a fourth threshold (Step S671) according to the determining result of the event detection circuit 110. Step S671 shown in FIG. 7 may be analogized with reference to the related description of Step S560 shown in FIG. 6. When the change scope of the automatic exposure gain (or the exposure duration) exceeds the fourth threshold (the determining result of Step S671 is "the change scope is less than the fourth threshold"), the backlight control device 100 may proceed to Step S672 to maintain the backlight 20 (not change the brightness of the backlight 20). Step S672 shown in FIG. 7 may refer to the related description of Step S570 shown in FIG. 6, so descriptions thereof are omitted. When the change scope is greater than the fourth threshold (the determining result of Step S671 is "the change scope is greater than the fourth threshold"), the backlight control device 100 may proceed to Step S673. In Step S673, the backlight controller 120 may correspondingly adjust the backlight 20 according to the change scope. Step S673 shown in FIG. 7 may refer to the related description of Step S580 shown in FIG. 6, so descriptions thereof are omitted.

Figure 8:
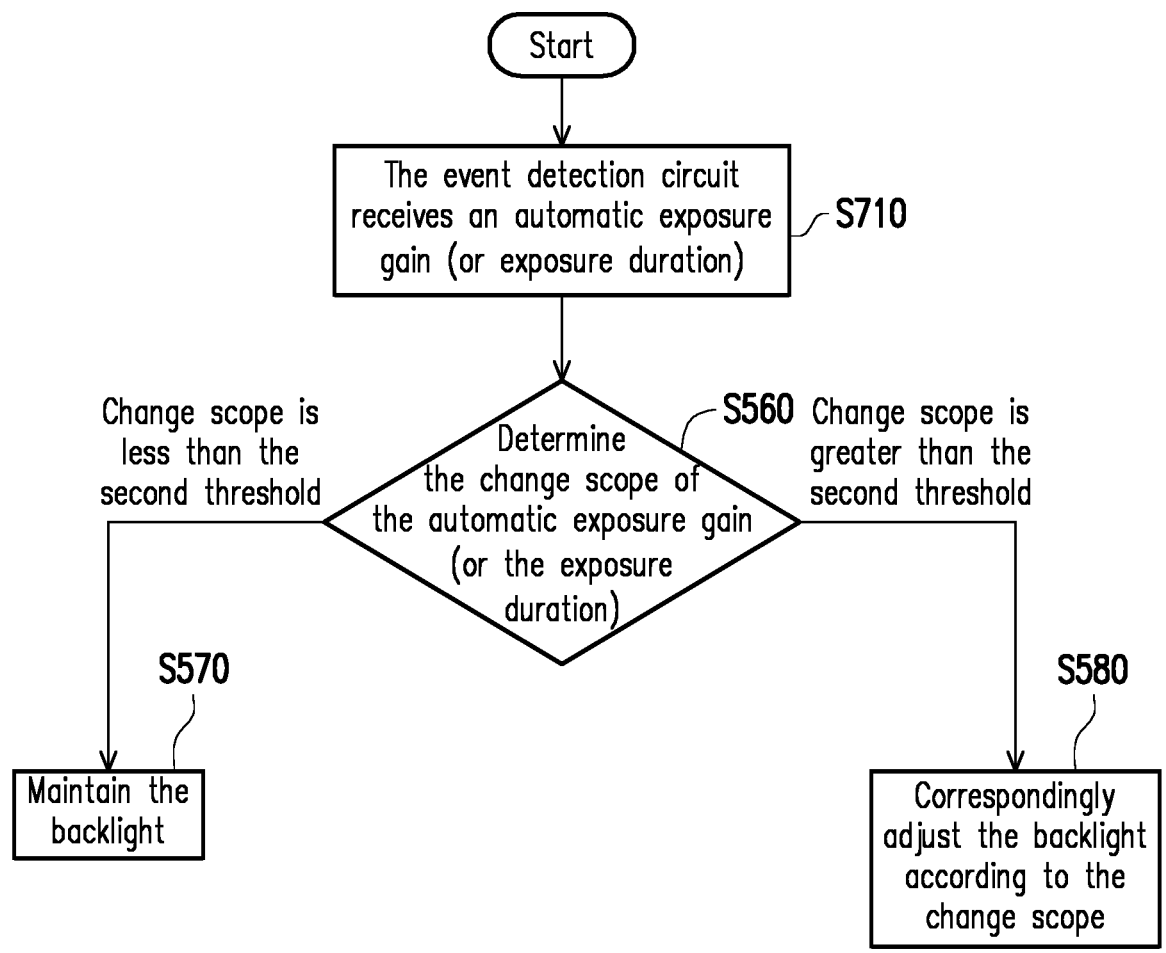
FIG. 8 is a schematic flow diagram of a backlight control method according to a further more embodiment of the invention.

FIG. 8 is a schematic flow diagram of a backlight control method according to a further more embodiment of the invention. Referring to FIG. 1 and FIG. 8, in Step S710 shown in FIG. 8, an event detection circuit 110 may receive an automatic exposure gain (or exposure duration) corresponding to a current image frame IMG from a low-power always-on image sensor (a sensing circuit 10). Steps S560, S570 and S580 shown in FIG. 8 may refer to the related descriptions of Steps S560, S570 and S580 shown in FIG. 6, so descriptions thereof are omitted.

The above blocks of the event detection circuit 110 and (or) the backlight controller 120 may be implemented in the form of hardware, firmware or software (namely program), or in a combined form of the foregoing three forms according to different design requirements.

In terms of the hardware form, the blocks of the event detection circuit 110 and (or) the backlight controller 120 may be implemented in logic circuits on an integrated circuit. The related functions of the event detection circuit 110 and (or) the backlight controller 120 may be implemented as hardware by using hardware description languages (such as Verilog HDL or VHDL) or other suitable programming languages. For example, the related functions of the event detection circuit 110 and (or) the backlight controller 120 may be implemented in one or more of a controller, a micro-controller, a microprocessor, an application-specific integrated circuit (ASIC), a digital signal processor (DSP), a field programmable gate array (FPGA) and/or various logic blocks, modules and circuits in other processing units.

In terms of the software form and/or the firmware form, the related functions of the event detection circuit 110 and (or) the backlight controller 120 may be implemented as programming codes. For example, the event detection circuit 110 and (or) the backlight controller 120 are implemented by using, for example, general programming languages (such as C, C++ or a combined language) or other suitable programming languages. The programming codes may be recorded/stored in a recording medium, and the recording medium includes, for example, a read only memory (ROM), a storage device, and (or) a random access memory (RAM). A computer, a central processing unit (CPU), a controller, a micro-controller or a microprocessor may read and execute the programming codes from the recording medium to realize related functions. As the recording medium, a "non-transitory computer readable medium" may be used, such as a tape, a disk, a card, a semiconductor memory, a programmable logic circuit and the like. Moreover, the program may also be provided to the computer (or a CPU) via any transmission medium (such as a communication network or a broadcast wave). The communication network is, for example, the Internet, a wired communication medium, a wireless communication medium or other communication mediums.

Based on the above, the backlight control device 100 of the embodiments of the invention may receive the image frame IMG and (or) the automatic exposure gain (or the exposure duration) from the sensing circuit 10. The event detection circuit 110 may determine whether there is a user face in the image frame IMG, and the backlight controller 120 may automatically dim (or turn off) the backlight 20 of the display panel (not shown) according to the determining result. The user may be possibly away from the display device (the backlight control device 100) temporarily to handle other things during the use of the display device. When the user is away from the display device, there is no user face in the image frame IMG, so that the backlight controller 120 may automatically dim the backlight 20. When the backlight 20 is dimmed (or turned off), the power consumption of the display device may be reduced. In addition, when the backlight 20 is automatically dimmed, other people are unable to peep at the display content of the display device.

Although the invention has been described with reference to the above embodiments, the embodiments are not intended to limit the invention. A person of ordinary skill in the art may make variations and improvements without departing from the spirit and scope of the invention. Therefore, the protection scope of the invention should be subject to the appended claims.

What is claimed is:
1. A backlight control device, comprising:
an event detection circuit, configured to receive an image frame, wherein the event detection circuit determines whether there is a user face in the image frame to generate a determining result; and
a backlight controller, coupled to the event detection circuit to receive the determining result, wherein the backlight controller adjusts the backlight of a display panel to normal brightness when the determining result indicates that the user face is determined;
wherein the size of the user face is greater than a first threshold and in a predetermined region;
wherein the event detection circuit further determines whether there is a non-user face, and there is a message for warning the user through a screen of the display panel or a speaker embedded in the display device when the determining result indicates that the non-user face is determined; and wherein the size of the non-user face is greater than a second threshold.

2. The backlight control device according to claim 1, wherein the backlight controller dims backlight of the display panel when the determining result indicates that there is no user face in the image frame.

3. The backlight control device according to claim 1, wherein the first threshold is greater than the second threshold.

4. The backlight control device according to claim 1, wherein the image frame may be a depth map, a color image or a monochrome image from a sensing circuit.

5. The backlight control device according to claim 1, wherein
the event detection circuit further determines whether a representative point of the user face is located in the predetermined region and determines duration that the representative point of the user face is away from the predetermined region to generate the determining result; and
the backlight controller dims the backlight when the determining result indicates that the duration that the representative point of the user face is away from the predetermined region is greater than a third threshold.

6. The backlight control device according to claim 1, wherein
the event detection circuit is configured to receive an automatic exposure gain or exposure duration corresponding to the image frame;
the event detection circuit determines a change scope of the automatic exposure gain or the exposure duration to generate a second determining result; and
the backlight controller correspondingly adjusts the backlight according to the second determining result.

7. The backlight control device according to claim 6, wherein
the backlight controller maintains the backlight when the second determining result indicates that the change scope is less than a threshold; and
the backlight controller correspondingly adjusts the backlight according to the change scope when the second determining result indicates that the change scope is greater than the threshold.

8. A backlight control method, comprising:
receiving an image frame by an event detection circuit;
determining, by the event detection circuit, whether there is a user face in the image frame to generate a determining result;
adjusting, by a backlight controller, backlight of a display panel to normal brightness when the determining result indicates that the user face is determined, wherein the size of the user face is greater than a first threshold and in a predetermined region; and
determining whether there is a non-user face;
wherein there is a message for warning the user through the screen of the display panel or a speaker embedded in the display device when the determining result indicates that the non-user face is determined, wherein the size of the non-user face is greater than a second threshold.

9. The backlight control method according to claim 8, further comprising:
dimming backlight of the display panel by a backlight controller when the determining result indicates that there is no user face in the image frame.

10. The backlight control method according to claim 8, wherein the first threshold is greater than the second threshold.

11. The backlight control method according to claim 8, wherein the image frame may be a depth map, a color image or a monochrome image from a sensing circuit.

12. The backlight control method according to claim 8, further comprising:
determining, by the event detection circuit, whether a representative point of the user face is located in the predetermined region;
determining, by the event detection circuit, duration that the representative point of the user face is away from the predetermined region to generate the determining result;
dimming the backlight by the backlight controller when the determining result indicates that the duration that the representative point of the user face is away from the predetermined region is greater than a third threshold.

13. The backlight control method according to claim 8, further comprising:
receiving, by the event detection circuit, an automatic exposure gain or exposure duration corresponding to the image frame;
determining, by the event detection circuit, a change scope of the automatic exposure gain or the exposure duration to generate a second determining result; and
correspondingly adjusting, by the backlight controller, the backlight according to the second determining result.

14. The backlight control method according to claim 13, further comprising:
maintaining the backlight by the backlight controller when the second determining result indicates that the change scope is less than a threshold; and
correspondingly adjusting the backlight according to the change scope by the backlight controller when the second determining result indicates that the change scope is greater than the threshold.

* * * * *